United States Patent [19]

Ueda et al.

[11] Patent Number: 4,871,906
[45] Date of Patent: Oct. 3, 1989

[54] FOCUS DETECTING DEVICE USING CORRELATION

[75] Inventors: Kouichi Ueda; Akihiro Fujiwara; Hirofumi Suda; Masamichi Toyama, all of Kanagawa; Kunihiko Yamada, Tokyo, all of Japan

[73] Assignee: Canon Kabushiki Kaisha, Tokyo, Japan

[21] Appl. No.: 107,451

[22] Filed: Oct. 8, 1987

[30] Foreign Application Priority Data

Oct. 8, 1986 [JP] Japan ................................. 61-239787

[51] Int. Cl.$^4$ .......................... G01J 1/20; H04N 5/232
[52] U.S. Cl. ..................................... 250/201; 358/227
[58] Field of Search .......................... 250/201 PF, 204; 358/227

[56] References Cited

U.S. PATENT DOCUMENTS

| | | | |
|---|---|---|---|
| 4,317,135 | 2/1982 | Pitruzzello | 258/227 |
| 4,414,469 | 11/1983 | Ogasawara | 250/201 DF |
| 4,470,676 | 9/1984 | Kinoshita et al. | 358/227 |
| 4,615,598 | 10/1986 | Koshiishi | 358/227 |
| 4,672,439 | 6/1987 | Florence et al. | 358/227 |

Primary Examiner—David C. Nelms
Assistant Examiner—Stephone B. Allen
Attorney, Agent, or Firm—Robin, Blecker, Daley & Driscoll

[57] ABSTRACT

A focus detecting device for determining a focused state of a photo taking optical system through a video signal obtained from an image sensor comprises a detecting circuit arranged to detect focused degrees obtained by scanning at a plurality of scanning line parts of an image sensing plane; a correlation determining circuit arranged to determine a correlation between positions on scanning lines at which the focused degrees are detected during the processes of the scanning lines; and a computing circuit arranged to determine a focused state by computing the focused degrees detected from the scanning line parts which are determined to be correlated to each other by the correlation determining circuit.

24 Claims, 7 Drawing Sheets

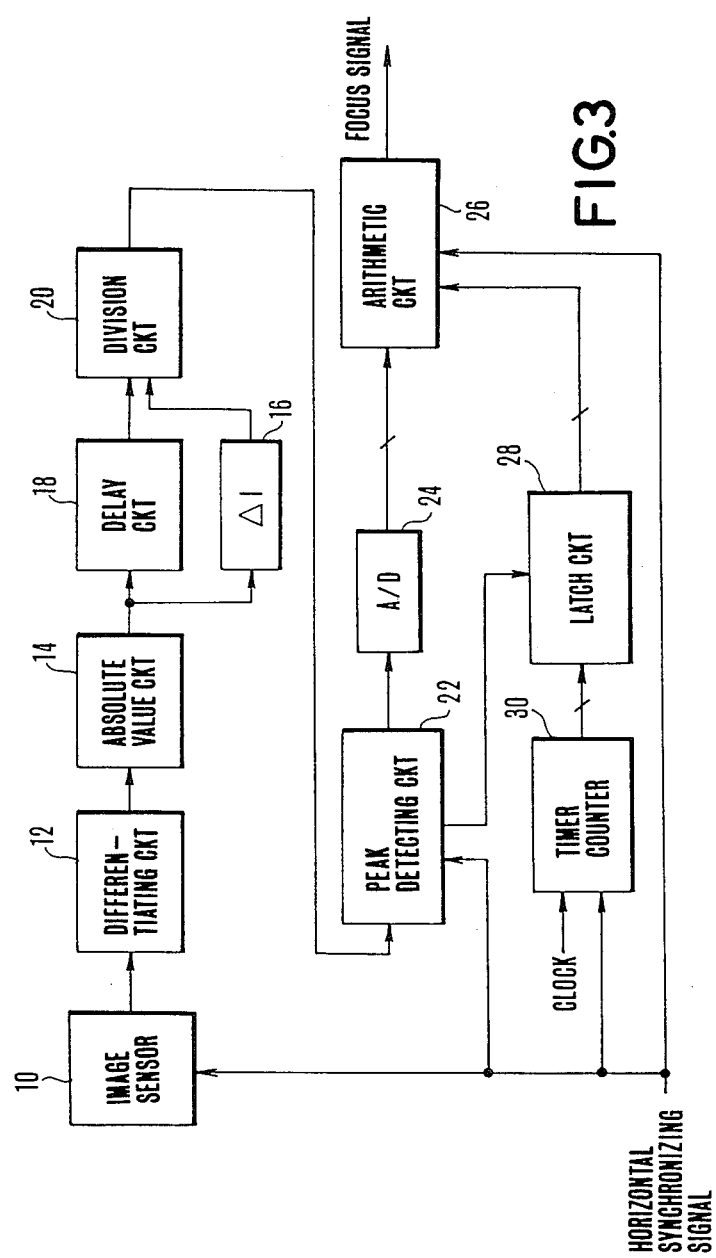

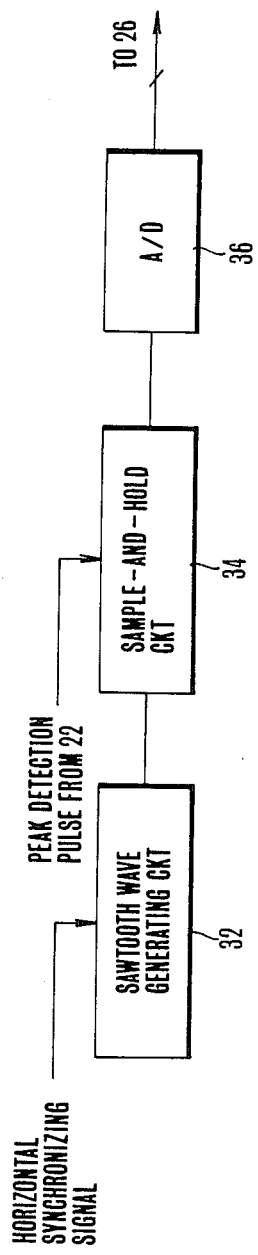

FOCUS DETECTING DEVICE USING CORRELATION

BACKGROUND OF THE INVENTION

1. Field of the Invention

This invention relates to a focus detecting device for detecting the focusing state of a photo taking optical system through a video signal produced from an image sensor.

2. Description of the Related Art

Heretofore, for a camera of the kind having an image sensor, such as a video camera or the like, there has been known a method in which the sharpness of an image of a photographing object formed on an image sensing plane is detected through a video signal obtained from the image sensor and a photo taking optical system is driven to shift its position in such a way as to maximize the sharpness of the object image. This method includes, for example, a well known method called "hill climbing servo method" which is described in detail in "NHK GIJUTSU KENKYU," 1965, Vol. 17, No. 1, (Whole No. 86), p 21 to p 37. In accordance with the hill climbing servo method, a high frequency component of a video signal is extracted by means of a high-pass filter or the like and then the position of an optical system is shifted to a position at which the amplitude of the high frequency component reaches a maximum value. In order to find this position, however, the amplitude obtained at the present optical system position must be compared with a previous amplitude value obtained a little while ago at its previous position or with an amplitude value obtained at an optical system position which somewhat deviates from the present position. Therefore, a shortcoming of the method resides in that an in-focus position is not detectable until the optical system comes to pass the in-focus position. It is another shortcoming of the method that the amplitude of the high frequency component is dependent in part on illuminating conditions and, therefore, it tends to reach the maximum value due to variations in the illuminating conditions, movements of the object, etc. even when the optical system is still out of focus. This shortcoming has often resulted in erroneous actions.

A focus detecting method which is free from the above stated shortcoming has been proposed in U.S. Pat. Application Ser. No. 922,740, now U.S. Pat. No. 4,804,831, filed Oct. 24, 1986, assigned to the same assignee as the assignee of the present invention. In the case of this method, attention is directed to the width of the edge of an object to be photographed. The width is detected by computing a ratio between the gradient of lightness variations of the edge portion and a difference in lightness. Then, the focused state of the object image formed on an image sensing plane is determined according to the value of the ratio thus computed. This method is employed also in an invention disclosed in U.S. Pat. Application Ser. No. 046,252, now abandoned which was filed May 5, 1987 and also assigned to the same assignee as that of the present invention. A brief description of this method is as follows:

Referring to FIG. 1(a), an edge portion 50 of an object is assumed to be within a focus detecting area 52. A spatial coordinate axis x perpendicularly crosses the optical axis of an optical system and extends in the horizontal scanning direction of an image sensor. A video signal I(x) (more specifically, a luminance signal) which is obtained from the image sensor steeply changes in the case of an in-focus state as shown in FIG. 1(b) and mildly changes in the event of an out-of-focus state as shown in FIG. 1(c). The width $\Delta x$ of the changing part of the video signal I(x) corresponding to the edge portion of the object becomes a minimum value $\Delta x_o$ in the case of the in-focus state and increases according as the position of the optical system deviates from the in-focus state. The width $\Delta x$ is determined by the diameter of circle of confusion of the optical system, the resolving power of the image sensor and the frequency bandwidth of a video signal processing circuit. However, since the latter two are irrelative to the focusing state of the optical system, the in-focus state, the out-of-focus state and the degree of the out-of-focus (hereinafter referred to as defocus) state. In other words, the optical system can be discriminated as in an in-focus state in the case of $\Delta x \approx \Delta x_o$. This discrimination is made independently of the average lightness of the edge portion and the contrast of the object to be photographed.

More specifically, the differential value $dI(x)/dx$ of the video signal $I(x)$ and the variation value $\Delta I$ of the lightness are computed and $P (=I/\Delta x)$ which is obtained from a formula $P=(dI(x)/dx)/\Delta I$ is considered to be an in-focus signal. Since the variable x represents also the horizontal scanning direction, the value of $dI(x)/dx$ is obtainable by temporally differentiating the video signal.

However, in cases where a high degree of focusing precision is required, the method is likely to result in an erroneous action due to an inconsistency of the evaluation value P which arises depending on a movement of the object or the image position of the object on the image plane, i.e. the position of the image relative to the picture elements which constitute the image sensor. In view of this, a method of averaging the focus evaluation values either for all horizontal scanning lines or for scores of scanning lines obtained within a focus detecting area of the image plane has been proposed as a solution of the problem. The method of merely averaging the value P, however, would result in an erroneous evaluation value in the event of an object which is short in the vertical direction as shown in FIG. 2.

SUMMARY OF THE INVENTION

It is an object of this invention to provide a focus detecting device which is capable of solving all of the above stated problems of the prior art and is arranged to prevent any erroneous averaging action by duly taking into consideration a relation between the object and the focus evaluation value obtained for each scanning line.

To attain this object, a focus detecting device according to this invention comprises detecting means which is arranged to detect a focused degree from the scanning line parts on the image sensing plane of an image sensor; determining means arranged to determine the presence or absence of any correlation between scanned image parts; and computing means which is arranged to discriminate an in-focus state by computing the focused degrees detected from the scanned image parts found to have a correlation by the determining means. The device is thus arranged to determine an in-focus state or a defocused state according to the result of a computing, averaging operation which is performed on the focused degrees obtained only from the correlated scanned image parts. The device is thus capable of excluding the focus evaluation values of object image parts having no correlation between them from data on which an in-focus state is to be determined. Therefore, a discrimination of an in-focus state can be made only on the basis of data on a main focusing object, so that the reliability of a focus signal can be enhanced. Further, the averaging arrangement serves to improve the S/N ratio of the device.

Other objects and features of the invention will become apparent from the following detailed description of embodiments thereof taken in connection with the accompanying drawings.

BRIEF DESCRIPTION OF THE DRAWINGS

FIG. 3 is a block diagram showing the arrangement of a focus detecting device arranged, as an embodiment of this invention.

FIGS. 5 and 6 show in block and circuit diagrams a modification of the focus detecting device shown in FIG. 3.

DETAILED DESCRIPTION OF THE PREFERRED EMBODIMENTS

Figure 1A:
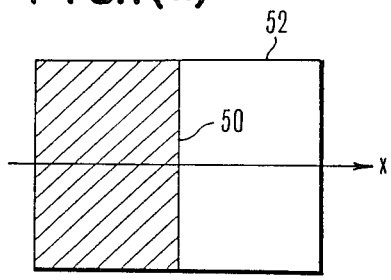
FIGS. 1(a), 1(b) and 1(c) are illustrations of a focus detecting method on which the focus detecting device of this invention is based.
Figure 1B:
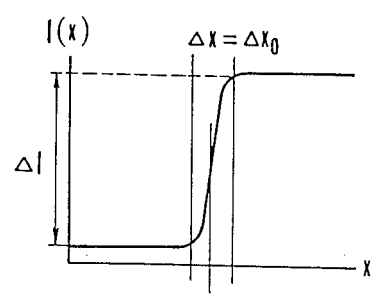
Figure 1C:
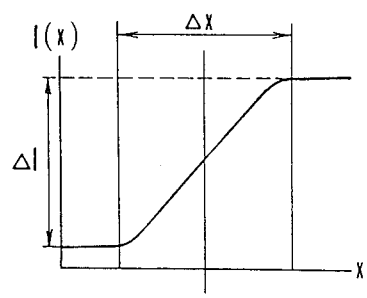
Figure 2:
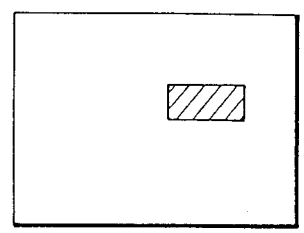
FIG. 2 shows by way of example an object image.

An embodiment of this invention is described as follows with reference to the accompanying drawings: Referring to FIG. 3 which shows it in a block diagram, an image sensor 10 which is a CCD or the like is arranged to convert an optical image formed on an image sensing plane into an electrical signal. A video signal thus produced from the image sensor 10 is differentiated by a differentiating circuit 12 and is converted into a normal signal by an absolute value circuit 14. A $\Delta I$ circuit 16 is arranged to integrate the signal output of the absolute value circuit 14 and to measure the above stated value $\Delta I$. A delay circuit 18 is arranged to compensate for a time delay caused by the $\Delta I$ circuit 16. A division circuit 20 is arranged to divide the output (dI/dx) of of the delay circuit 18 by the output ($\Delta I$) of the $\Delta I$ circuit 16. The output of the division circuit 20 varies with time, i.e. x. The maximum value of the output represents the focused degree of the edge portion of the object image. A peak detecting circuit 22 is arranged to detect the peak of the output of the division circuit 20. A peak value thus obtained is supplied to an analog-to-digital (hereinafter referred to as A/D) conversion circuit 24. The value held at the peak detecting circuit 22 is arranged to be cleared by a horizontal synchronizing signal. The A/D conversion circuit 24 is arranged to convert the analog value of its input into a digital value and sends it to an arithmetic circuit 26. The arithmetic circuit 26 includes a known micro-processor.

Further, the peak detecting circuit 22 sends a peak detection pulse signal to a latch circuit 28 every time it receives a value larger than a value being held thereby. A timer counter 30 is arranged to be cleared by the horizontal synchronizing signal and to count clock pulses supplied thereto. The counted value of the counter 30 indicates a horizontal position obtained every time horizontal scanning is performed. The latch circuit 28 is arranged to latch the counted value of the counter 30 in response to the peak detection pulse signal coming from the peak detecting circuit 22. The initial value of the counter 30 is of course set at a value which compensates for the time delay caused by the delay circuit 18.

Figure 7:
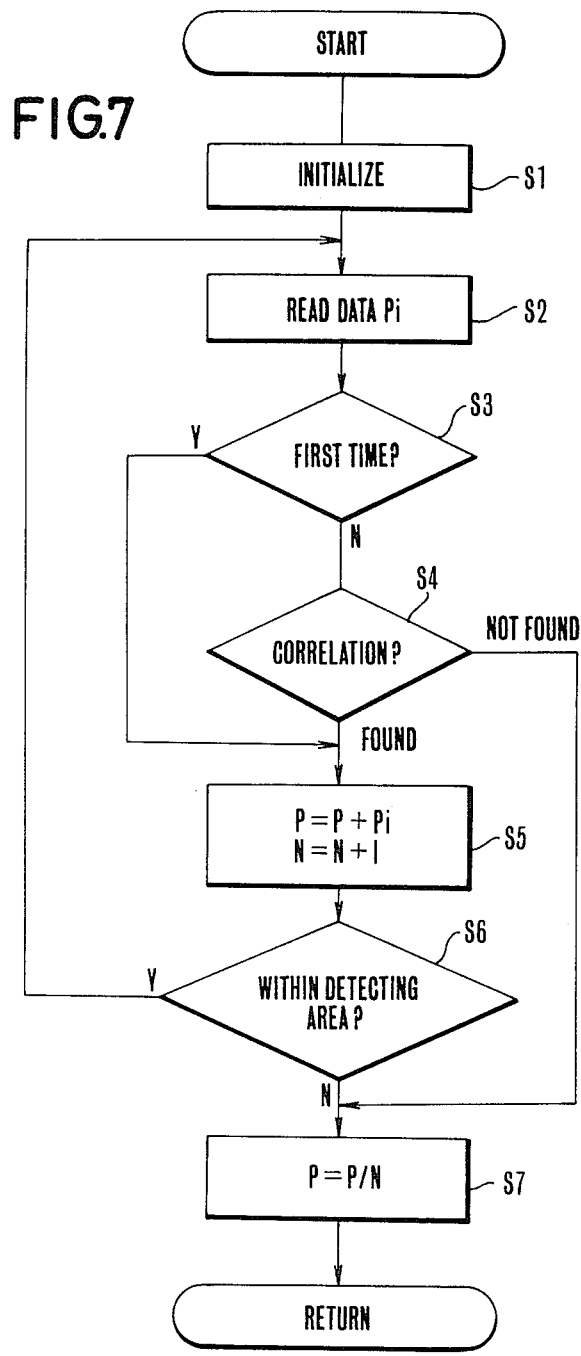
FIG. 7 is a flow chart showing the operation of an arithmetic circuit included in the block diagram of FIG. 3.

Upon completion of one horizontal scanning process, the arithmetic circuit 26 reads and takes in the output of the A/D conversion circuit 24 and the value held at the latch circuit 28. Therefore, the arithmetic circuit 26 is capable of obtaining the last focus evaluation value P and the horizontal position thereof for every horizontal scanning line part. The details of the operation of the arithmetic circuit 26 is as shown in a flow chart in FIG. 7. Referring to FIG. 7, at a step S1, the arithmetic circuit 26 first initialize its internal variables P and N. At a step S2: The circuit 26 reads the data of a first horizontal scanning line (including the peak value Pi and the horizontal position of the peak). At a step S3: A check for correlativity is omitted for the first data and the flow of operation comes to a step S5. At the step S5: The peak value is added to the variable P. To the variable N is added 1. N is a counted number of the horizontal scanning lines. At a step S6: A discrimination is made as to whether the data is obtained from within a focus detecting area. If so, the flow of operation comes back to the step S2 and reads next data. At a step S4: A check is made for a correlation by comparing the peak position read and taken in with the previous peak position. If no correlation is found between these peak positions, the flow comes to a step S7. If a correlation is found, the flow comes to a step S5. At the step S7: In the event of deviation from the detecting area, or in the case of no correlation, an average value of the variables P is obtained and the flow returns. The value P thus obtained is a focus evaluation value. The focus evaluation value is an absolute value indicative of a focused degree. Focus adjustment can be carried out according to this value.

Further, it is also possible to make a discrimination between an in-focus state and a defocused state by comparing the focus evaluation value P with a reference value preset on the basis of some intrinsic values such as a minimum diameter of circle of confusion, etc. that are determined by the image sensing system and the optical system of the apparatus. Therefore, this value can be used for triggering a restart of operation after the photo taking optical system comes to a stop with an in-focus point attained.

Figure 4A:
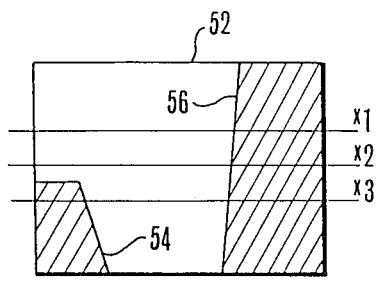
FIGS. 4(a), 4(b), 4(c) and 4(d) are illustrations of the operation of the focus detecting device of this invention.
Figure 4B:
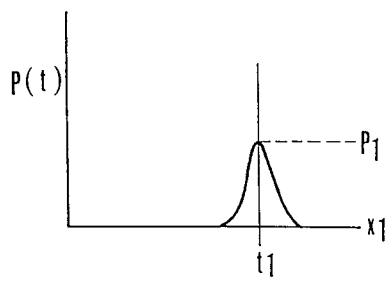
Figure 4C:
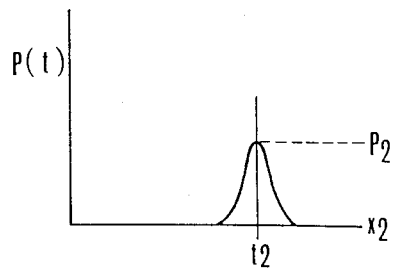
Figure 4D:
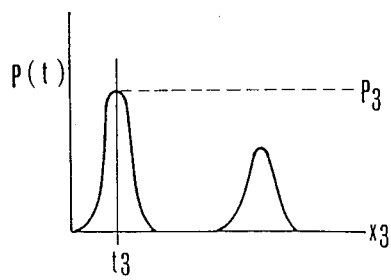

For example, assuming that there are edge portions 54 and 56 of two objects within the focus detecting area 52 and that horizontal scanning is performed in the order of scanning lines x1, x2 and x3 as shown in FIG. 4(a), the output of the division circuit 20 which is obtained at the scanning line x1 changes as shown in FIG. 4(b) to have a peak value P1 (focus evaluation value) at a horizontal time position t1. Then, the output of the division circuit 20 obtained at the scanning line x2 changes as shown in FIG. 4(c) to have a peak value P2 at a horizontal time position t2. The output of the circuit 20 obtained at the scanning line x3 comes to have two peaks as shown in FIG. 4(d). Of these two peaks of FIG. 4(d), a larger peak value P3 is read and taken in by the arithmetic circuit 26 together with a horizontal time position t3 thereof. The peak position t1 of the scanning line x1 and the peak position t2 of the scanning line x2 are close to each other. However, the peak position t3 is not close to the peak position t2. In this instance, therefore, the arithmetic circuit 26 adds the evaluation values P1 and P2 and averages them while the evaluation value P3 is not used in averaging.

The arithmetic circuit 26 thus adds and averages the evaluation values P obtained from the edge portion of one and the same object. An average value thus obtained is produced from the arithmetic circuit 26 as a focus signal indicative of the focusing degree of the optical system. The added mean obtaining arrangement of course may be replaced with a weighted mean obtaining arrangement. The evaluation values P which are arranged to be obtained from an edge portion of the same object image also may be changed to be obtained for averaging, for example, from the middle part of some presumed distribution curve representing a part of the edge portion.

Further, since only the correlated focus evaluation values P are used for averaging, if a peak position which is read out for a horizontal scanning line is not in proximity to a peak position read out for a preceding horizontal scanning line (i.e. if there is no correlation between them), the flow of operation may be shifted to the averaging process by suspending the reading action on ensuing focus evaluation values P and ensuing peak positions. The arrangement to make a discrimination between a correlation and no correlation in this manner obviates the necessity of having any additional circuit in respect of correlativity and thus contributes to the simplification of structural arrangement. Further, the correlation discriminating method may be replaced with a method of obtaining a difference between one horizontal scanning line part and a next horizontal scanning line part.

In the case of the embodiment shown in FIG. 3, the horizontal synchronizing signal is used. However, the use of the horizontal synchronizing signal may be replaced with the use of a vertical synchronizing signal. While the correlation between the scanning line part is utilized in the case of the horizontal synchronizing signal, a correlation between fields or frames is utilized in the event of using the vertical synchronizing signal. Further, the averaging action may be carried out by using a signal obtained by utilizing the correlation between horizontal scanning line parts together with a signal obtained by utilizing the correlation between the fields or frames. In that case, the advantageous effect of the invention can be furthered by the use of both the correlations between the scanning line parts and between the fields or frames. In the case of this modification, the horizontal and vertical positions may be detected by means of two channels of counters. It is also possible, to find by computation the position in the vertical direction from a counted value obtained by counting the horizontal scanning lines.

Figure 6:
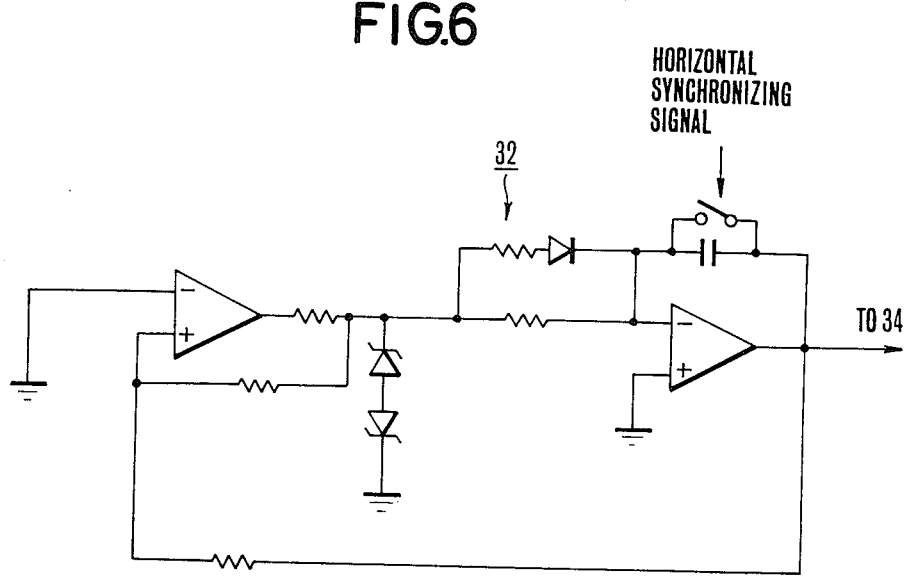

Horizontal scanning position detecting means is formed by a digital circuit including the counter 30 and the latch circuit 28. However, this arrangement may be replaced with an arrangement using an analog circuit in a manner as shown in FIG. 5. Referring to FIG. 5, a sawtooth wave generating circuit 32 is arranged to be started by a horizontal synchronizing signal. A sample-and-hold circuit 34 is arranged to hold the voltage output of the sawtooth wave generating circuit 32 in response to a peak detection pulse coming from the peak detecting circuit 22. An A/D conversion circuit 36 is arranged to convert the value held by the sample-and-hold circuit 34 into a digital signal and to supply it to the arithmetic circuit 26. The analog-to-digital converting action of the A/D conversion circuit 36 is of course performed in time for data reading to be accomplished by the arithmetic circuit 26. FIG. 6 shows by way of example the details of a known circuit arrangement for the sawtooth wave generating circuit 32.

In this embodiment, means for detecting a focused degree obtained at each horizontal scanning line part is formed by the circuit elements 12 and 20. The arithmetic circuit 26 is arranged to serve as means for detecting a correlation between horizontal scanning line parts and also as means for determining an in-focus state through a computing operation on the focused degrees detected.

As obvious from the foregoing description, a focus signal for an image is obtained by computing, or averaging for example, only the focus evaluation values that are obtained from the same object image. This arrangement effectively improves the S/N ratio of the focus signal. Further, since evaluation values having no correlation are excluded in determining the focused state, the reliability of the focus signal can be enhanced.

Figure 8:
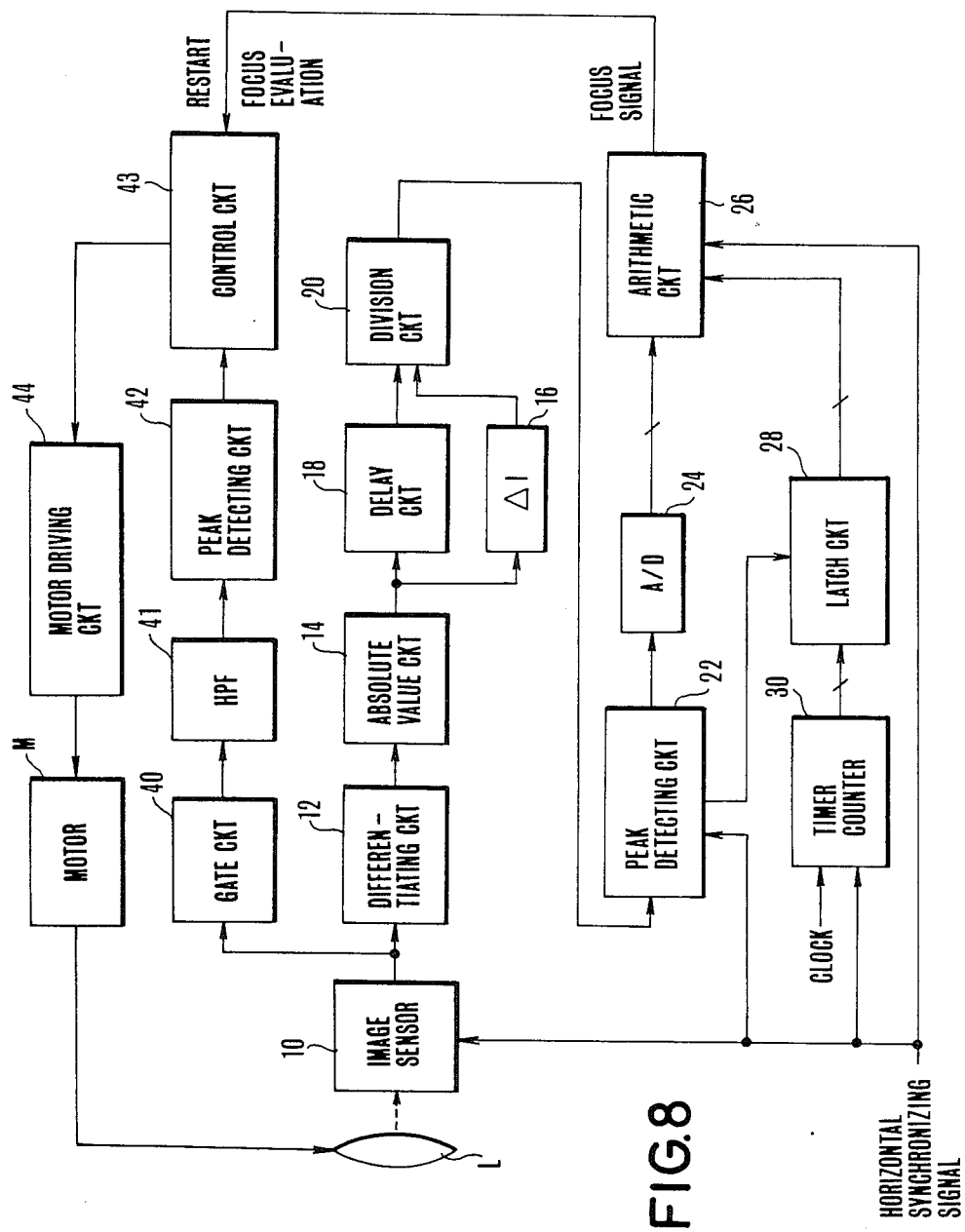
FIG. 8 is a block diagram showing a second embodiment of this invention.

FIG. 8 shows in a block diagram a second embodiment of this invention. The same components as those included in the embodiment shown in FIG. 3 are indicated by the same reference numerals and the details of them are omitted from the following description:

A video signal produced from an image sensor 10 is supplied to a gate circuit 40. A portion of the video signal corresponding to a preset detecting area (a distance measuring frame) on an image sensing plane (not shown) is allowed to pass the gate circuit 40. Then, a high frequency component of the output of the gate circuit 40 is extracted by a high-pass filter 41. A peak detecting circuit 42 then detects the peak value of the high frequency component. The data of this peak value is supplied to a control circuit 43 which is composed of a micro-computer. The control circuit 43 then controls a motor driving circuit 44 in such a way as to cause a photo taking lens driving motor M to rotate to cause the output of the peak detecting circuit 42 to reach a maximum value. By this, the position of a photo taking lens L can be shifted to an in-focus position. This arrangement is made in accordance with the method which is called the hill-climbing servo method and is popularly used for focusing devices. The embodiment is arranged to determine an in-focus state and to control a restarting action to be performed as necessary after the in-focus state is obtained with the focus detecting device of this invention arranged in combination with the hill-climbing servo method. In other words, in accordance with the hill-climbing servo method, the lens position is shifted for the object to be photographed and the position of the lens is then controlled in such a way as to cause the high frequency component which varies according as the lens position is shifted to reach a maximum value thereof. However, as mentioned in the foregoing section entitled "Description of the Related Art," this method tends to result in an erroneous action as the amount of the high frequency component varies with changes in the luminance and contrast of the object. The method thus requires use of some means for accurately making a discrimination between in-focus and defocused states.

In the case of this embodiment, the basic portion of the focusing operation is performed in accordance with the hill-climbing servo method; and then, determining an in-focus state when an in-focus point is attained and giving an instruction for restart of a focusing action when the lens is defocused after the lens is stopped with the in-focus point attained are arranged to be accomplished on the basis of a focus evaluation value obtained from the arithmetic circuit 26. This focus evaluation value is obtained by absolutely evaluating the focused state of the image plane without being affected by the contrast of the object, etc. Therefore, the embodiment is capable of reliably making a discrimination between an in-focus state and a defocused state. Even in case that the amount of the high frequency component is changed, for example, by a change in contrast after the photo taking lens L comes to a stop with an in-focus state attained, such a change would never be mistaken for deviation from the in-focus state. Further, in the event of actual deviation from an in-focus state on the contrary, this deviation can be accurately detected, without being affected by the contrast of the object, and then the motor driving circuit 44 is instructed for restart, so that a focusing action can be resumed without fail.

In accordance with this invention, the focusing action can be accomplished either by driving the photo taking optical system from its position corresponding to the focus evaluation value produced from the arithmetic circuit 26 by the generally practiced known method as in the case of FIG. 8. The focus evaluation values may be used for making a discrimination between an in-focus state and a defocus state and in performing control over the timing for restart after completion of one focusing process. This invention is not limited to the embodiments and their modifications described in the foregoing but many other modifications and changes are possible.

What is claimed is:

1. A focus detecting device comprising:
   (a) detecting means for detecting a focused degree obtained at parts having a plurality of scanning lines on an image sensing plane which is being scanned;
   (b) discriminating means for discriminating a correlation between said scanning line parts, related to an image of an object incident on said image sensing plane; and
   (c) computing means arranged to determine an in-focus state by computing said focused degree detected at each of said scanning line parts which are found to have a correlation by said discriminating means.

2. A device according to claim 1, wherein said detecting means is arranged to detect the peak value of a signal representing a focused degree obtained from a video signal obtained at each of said scanning line parts.

3. A device according to claim 1, wherein said detecting means is arranged to detect the focused degree of said scanning line parts within a given focus detecting area set on said image sensing plane.

4. A device according to claim 1, wherein said computing means is arranged to have an average value of focused degrees obtained at scanning line parts which are correlated to each other employed as a focus evaluation value for a whole image plane.

5. A device according to claim 1, wherein said scanning lines are horizontal scanning lines.

6. A device according to claim 4, wherein said computing means is arranged to continuously perform an adding operation on the focused degrees of said scanning line parts which are found to have correlation with each other by said discriminating means and to compute an average value of them by ending said adding operation when said correlation ceases to be found any longer among said scanning line parts.

7. A device according to claim 5, wherein said discriminating means is arranged to find the correlation between peak value detecting positions on said scanning line parts at which the peak values of said signal representing the focused degree are detected from said scanning line parts.

8. A device according to claim 7, wherein said discriminating means is arranged to find the presence or absence of a correlation between adjacent scanning line parts.

9. A device according to claim 7, wherein said discriminating means is arranged to determine said scanning line parts to have a correlation with each other when detecting positions on the scanning lines at which the peak values of said signal representing the focused degree are detected are in proximity to each other.

10. A device according to claim 2, 7, or 9, wherein said signal representing the focused degree is formed on the basis of the width of the edge portion of the image of a photographing object formed on an image sensing plane.

11. A device according to claim 10, wherein said signal representing the focused degree is obtained by computing the width of said edge portion from a ratio between a lightness changing gradient and a difference in lightness obtained at the edge portion of the image of said object.

12. A focus discriminating device comprising:
   (a) focus signal output means for obtaining a focus signal relative to a focused degree from a video signal produced by scanning the image sensing plane of an image sensor a plurality of times, said output means being arranged to obtain said focus signal every time said image sensing plane is scanned;
   (b) peak detecting means for detecting the peak value of said focus signal produced from said focus signal output means every time said image sensing plane is scanned;
   (c) memory means for storing information on a position where the peak value of said focus signal is detected on each scanning line by said peak detecting means; and
   (d) focus discriminating means for discriminating a focused condition on the basis of the result of a computing operation which is performed on the peak values that are obtained from scanned parts found to be correlating with each other from position information stored by said memory means.

13. A device according to claim 12, wherein said focus discriminating means is arranged to make a discrimination between an in-focus state and an out-of-focus state by comparing the result of said computation with a predetermined value.

14. A device according to claim 12, wherein said computing operation of said focus discriminating means is performed to obtain an average value of said peak values which are found to have their detected positions correlated with each other in the information on their positions.

15. A device according to claim 12, wherein said focus signal relative to the focused degree is formed on the basis of the width of an edge portion of an object image formed on said image sensing plane.

16. A device according to claim 12, wherein said peak detecting means is arranged to produce a peak detection signal every time a peak is detected; and said memory means is arranged to store information on the detected position on said image sensing plane of said peak value according to said peak detection signal.

17. A device according to claim 12 or 15, wherein said scanning is a horizontal scanning action performed on said image sensing plane.

18. A device according to claim 12 or 16, wherein said focus discriminating means is arranged to perform a computing operation on peak values which are obtained from adjacent scanning line parts and are found to be correlated with each other according to information on their positions on adjacent scanning lines.

19. A focus discriminating device comprising:
   (a) detecting means for detecting, every time horizontal scanning is made, the peak value of a signal representing a focused degree which is found from a video signal obtained by horizontally scanning an image sensing plane by a computing operation on the width of an edge portion of a photographing object;
   (b) position detecting means for detecting the position at which said peak value is detected by said detecting means on said image sensing plane; and
   (c) computing means for discriminating a focused condition by performing a computing operation on peak values which are found to have their detected positions close to each other, on said image sensing plane, from position information produced by said position detecting means.

20. A device according to claim 19, wherein said computing means computes, as a focus evaluation value, an average value of said peak values having their detected positions located closely adjacent to each other.

21. A device according to claim 19, wherein said position detecting means is arranged to detect the detected positions of said peak values on horizontal scanning lines.

22. A device according to claim 21, wherein said computing means is arranged to compute peak values which have their positions in close proximity to each other in the horizontal direction of said image sensing plane.

23. An automatic focusing device comprising:
   (a) focal point adjusting means arranged to drive and shift the position of a photo taking optical system in the direction of increasing the peak value of a high frequency component of a video signal produced from an image sensing means;
   (b) detecting means arranged to detect focused degrees obtained by scanning from a plurality of scanning lines parts of the image sensing plane of said image sensing means;
   (c) correlation determining means for determining a correlation between said scanning line parts related to a distribution of said focused degrees on said image sensing plane;
   (d) computing means arranged to perform a computing operation on focused degrees detected from said scanning line parts which are determined to be correlated to each other by said correlation determining means and to produce a focus evaluation value of said image sensing plane;
   (e) focus determining means for determining a focused state by comparing said focus evaluation value with a predetermined value; and
   (f) control means for controlling said focal point adjusting means according to the output of said focus determining means.

24. A device according to claim 23, wherein said control means is arranged to restart said focal point adjusting means when deviation from an in-focus state is detected by said focus determining means after said photo taking optical system is stopped at an in-focus position by said focal point adjusting means.

* * * * *